(12) United States Patent
Liu et al.

(10) Patent No.: US 10,380,293 B1
(45) Date of Patent: Aug. 13, 2019

(54) METHODS, SYSTEMS, AND COMPUTER PROGRAM PRODUCT FOR IMPLEMENTING PHYSICS AWARE MODEL REDUCTION FOR THREE-DIMENSIONAL DESIGNS

(71) Applicant: Cadence Design Systems, Inc., San Jose, CA (US)

(72) Inventors: Jian Liu, Dublin, CA (US); Mazen Issam Baida, San Jose, CA (US); Mingjin Zhang, San Jose, CA (US); An-Yu Kuo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 218 days.

(21) Appl. No.: 15/383,604

(22) Filed: Dec. 19, 2016

(51) Int. Cl.
*G06F 17/50* (2006.01)

(52) U.S. Cl.
CPC ...... *G06F 17/5036* (2013.01); *G06F 17/5068* (2013.01)

(58) Field of Classification Search
CPC .................. G06F 17/5036; G06F 17/5068
See application file for complete search history.

(56) References Cited

U.S. PATENT DOCUMENTS

| | | | | |
|---|---|---|---|---|
| 6,068,660 A | * | 5/2000 | Lu | G06F 17/5036 703/2 |
| 6,285,973 B1 | * | 9/2001 | Nishino | G01R 31/001 703/13 |
| 7,131,105 B2 | | 10/2006 | Lorenz et al. | |
| 7,467,077 B2 | * | 12/2008 | Hirai | G06F 17/5018 703/14 |
| 7,509,247 B2 | * | 3/2009 | Jiao | G06F 17/5018 703/14 |
| 8,126,650 B2 | * | 2/2012 | Lu | G01V 3/083 166/250.01 |
| 8,255,849 B1 | * | 8/2012 | Okhmatovski | G06F 17/5018 716/110 |
| 8,954,308 B2 | * | 2/2015 | Choi | G06F 17/5018 703/14 |
| 9,305,124 B2 | * | 4/2016 | Han | G06F 17/5036 |
| 9,542,515 B2 | | 1/2017 | Liu et al. | |
| 9,672,319 B1 | | 6/2017 | Cao et al. | |
| 9,715,569 B1 | | 7/2017 | Liu et al. | |
| 9,773,086 B1 | | 9/2017 | Liu et al. | |
| 9,864,827 B1 | | 1/2018 | Tan et al. | |
| 2002/0042698 A1 | * | 4/2002 | Meuris | G06F 17/13 703/2 |
| 2003/0114944 A1 | * | 6/2003 | Bernstein | G06F 17/5022 700/97 |
| 2005/0076317 A1 | * | 4/2005 | Ling | G06F 17/5018 716/115 |

(Continued)

*Primary Examiner* — Nha T Nguyen
(74) *Attorney, Agent, or Firm* — Vista IP Law Group, LLP

(57) ABSTRACT

Disclosed are techniques for implementing physics aware model reduction for a design. These techniques identify a design model and generate a first set of solutions with a first discretization scheme and a plurality of inputs. A second discretization scheme may be generated at least by performing geometry simplification and re-discretization based in part or in whole on one or more distributions from the first set of solution. With the second discretization scheme, a second set of solutions may be generated with the second discretization scheme and the plurality of inputs.

20 Claims, 16 Drawing Sheets

(56) References Cited

U.S. PATENT DOCUMENTS

| | | | | |
|---|---|---|---|---|
| 2006/0009953 | A1* | 1/2006 | Okada | G06F 17/5018 |
| | | | | 702/196 |
| 2008/0072182 | A1* | 3/2008 | He | G06F 17/504 |
| | | | | 716/113 |
| 2008/0120084 | A1* | 5/2008 | Dengi | G06F 17/5036 |
| | | | | 703/14 |
| 2010/0169060 | A1* | 7/2010 | Zhu | G03F 7/705 |
| | | | | 703/2 |
| 2010/0218145 | A1* | 8/2010 | Engin | G06F 17/5018 |
| | | | | 716/130 |
| 2010/0312539 | A1* | 12/2010 | Yamagajo | G06F 17/5018 |
| | | | | 703/14 |
| 2011/0161905 | A1* | 6/2011 | Zhao | G06F 17/5036 |
| | | | | 716/115 |
| 2012/0185807 | A1* | 7/2012 | Tsai | G06F 17/5081 |
| | | | | 716/52 |
| 2012/0200566 | A1* | 8/2012 | Chernikov | G06T 17/205 |
| | | | | 345/420 |
| 2012/0271602 | A1* | 10/2012 | Han | G06F 17/5018 |
| | | | | 703/2 |
| 2014/0257784 | A1* | 9/2014 | Kwon | G06F 17/5009 |
| | | | | 703/13 |
| 2016/0180007 | A1* | 6/2016 | Svizhenko | G06F 17/5036 |
| | | | | 716/132 |
| 2016/0342729 | A1* | 11/2016 | Visvardis | G06F 17/5018 |

\* cited by examiner

METHODS, SYSTEMS, AND COMPUTER PROGRAM PRODUCT FOR IMPLEMENTING PHYSICS AWARE MODEL REDUCTION FOR THREE-DIMENSIONAL DESIGNS

BACKGROUND

Modern electronic design (e.g., IC package designs, printed circuit board or PCB designs, etc.) often include multi-layered structures to increase or maximize the available space. Accompanying the increasingly popular use of multi-layered structured structures is the analysis of the electromagnetic filed for the electronic product. Three-dimensional (3D) solvers modeling the structures and analyzing the electromagnetic field domain in the three-dimensional space may be used to analyze the electrical characteristics and perform electromagnetic simulations yet requires long and often prohibitively long runtime as well as large memory footprint to reach some reasonably accurate solutions. Pseudo-3D or two-and-a-half-dimensional (2.5D) solvers (collectively hybrid solvers or pseudo-3D solvers) have also been widely used due to their expediency and small memory footprint in reaching reasonably accurate solutions. These hybrid approaches pose a different set of problems with modern multi-layered electronic designs.

3D modeling tools and solvers model all structures of an electronic design (e.g., a printed circuit board or PCB design) in a 3D space and solve for the electrical characteristics and field domains in any direction. Because of the modeling and solving in the 3D space, the memory footprints as well as the computational costs associated with 3D solvers are often very expensive, if not prohibitively expensive. Hybrid modeling tools and solvers, on the other hand, are developed to solve for the electrical characteristics and parallel field domains (e.g., electromagnetic fields) between two parallel metal shapes.

Conventional approaches address this high computational resource consumption issue by simplifying the geometries in a 3D design model of the electronic design. These conventional approaches apply the geometry simplification techniques to a 3D design model, without any knowledge of the importance or significance of the components or their corresponding geometries being simplified and may thus simplify geometries that are more important or significance with respect to the physical or electrical characteristics that are the targets of analyses or simulations. To further exacerbate the problem, modern discretization schemes adaptively refine a set of meshes for a design according to the local precision requirements in the design model, also without accounting for the importance or significance of the component or the meshes therefor. For example, a discretization scheme may refine an area of a design model simply because the rate of change or the gradient of a computed characteristic varies rapidly between two or more adjacent nodes or meshes, regardless of the importance or significance of the component to which these two or more adjacent nodes or meshes correspond.

Therefore, there exists a need for a method, system, and computer program product for implementing physics aware model reduction for a three-dimensional design to address at least the aforementioned shortcomings and to implement integrated circuit designs in a much more efficient manner as far as at least time and computational resource utilizations are concerned.

SUMMARY

Disclosed are method(s), system(s), and article(s) of manufacture for implementing physics aware model reduction for a three-dimensional design in various embodiments. Some embodiments are directed to a method for implementing physics aware model reduction for a three-dimensional design. In these embodiments, a design model may be identified, and a first set of solutions may be generated with a first discretization scheme and a plurality of inputs. A second discretization scheme may be generated at least by performing geometry simplification and re-discretization based in part or in whole on one or more distributions from the first set of solution. With the second discretization scheme, a second set of solutions may be generated with the second discretization scheme and the plurality of inputs.

In some of these embodiments, generating the first set of solution may include the performance of identifying the plurality of inputs comprising one or more initial conditions, one or more boundary conditions, one or more property values, or one or more tolerances. In addition, geometry simplification may be optionally performed on the design model into a simplified design model without accounting for underlying physics or physical or electrical characteristics of the design model.

In addition or in the alternative, a first discretization scheme may be generated based in part or in whole upon a first tolerance, and the design model or a simplified design model may be discretized into a first set of meshes with the first discretization scheme for generating the first set of solutions in some embodiments. Moreover, a physical or electrical characteristic of interest for the design model and a spatial distribution of the physical or electrical characteristic in the design model may be respectively identified from the design model and the first set of solutions. A model reduction scheme may then be determined for the design model based in part or in whole on the spatial distribution of the physical or electrical characteristic in some of these embodiments.

In some embodiments, the design model comprises a three-dimensional or a pseudo-three-dimensional integrated circuit design, and the physical or electrical characteristic of interest comprises an electrical characteristic pertaining to an electromagnetic field generated by at least one circuit component in the three-dimensional or a pseudo-three-dimensional integrated circuit design. In some of the aforementioned embodiments, at least a portion of the design model may be partitioned into multiple regions based in part or in whole upon the model reduction scheme and the spatial distribution of the physical or electrical characteristic of interest; and the design model or a simplified design model may be reduced into a reduced design model at least by applying the model reduction scheme to the multiple regions for determining the second discretization scheme.

In some of these embodiments, a second tolerance may be identified for the second discretization scheme; and the second discretization scheme may be determined with the model reduction scheme and the second tolerance. In addition, the reduced design model may be discretized into a second set of meshes with the second discretization scheme; analysis or simulation results may be generated at least by analyzing or simulating the reduced design model using one or more physics based models with the second set of meshes; and a determination may be made to decide whether the analysis or simulation results converge based at least in part on one or more convergence criteria for determining the second set of solutions.

In addition or in the alternative, the second discretization scheme may be adapted for the reduced design model based in part or in whole upon one or more local precision requirements; and the second set of solutions may be generated for the physical or electrical characteristic of interest when the analysis or simulation results are determined to have converged based in part or in whole upon the one or more convergence criteria. In some embodiments, the design may be readied for manufacturing at least by improving the design represented by the design model based in part or in whole upon the second set of solutions.

Some embodiments are directed at one or more hardware modules that include and/or function in conjunction with at least one micro-processor as well as other related components or architectures of one or more computing systems and may be invoked to perform any of the methods, processes, or sub-processes disclosed herein. The hardware system may include one or more variants of a bounding box module, a projection module, an analysis module, an implementation module, an assignment module, and/or a cost module in some embodiments.

Each of these modules may include or function in tandem with electrical circuitry and one or more micro-processors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A module may be initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing physics aware model reduction for a three-dimensional design are described below with reference to FIGS. 1-8.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are directed to a method, system, and computer program product for implementing three-dimensional or multi-layer integrated circuit designs. Other objects, features, and advantages of the invention are described in the detailed description, figures, and claims.

Various embodiments reduce the size of a design model first by analyzing or simulating the design model with one or more physics based analyses or simulations with a coarse set of meshes. The design model are then partitioned into multiple regions according to one or more spatial distributions of one or more characteristics from the analysis or simulation results with the coarse set of meshes. Different model reduction schemes or techniques are applied to these multiple regions so that less important or significant regions are processed with heavier reductions.

Such reduction techniques may create a reduced design model at least by simplifying or even removing geometries from regions where one or more physical or electrical characteristics exhibit less importance or significance in the design model. The reduced design model may then be discretized into a smaller set of meshes having a fewer number of nodes and elements based on the model reduction scheme that apply different model reduction techniques to regions with different importance or significance. One or more analyses or simulations may then be performed on the reduced model with the smaller set of meshes to produce at least equally accurate results in regions that are designated with higher importance or significance while conserving computational resource utilizations.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
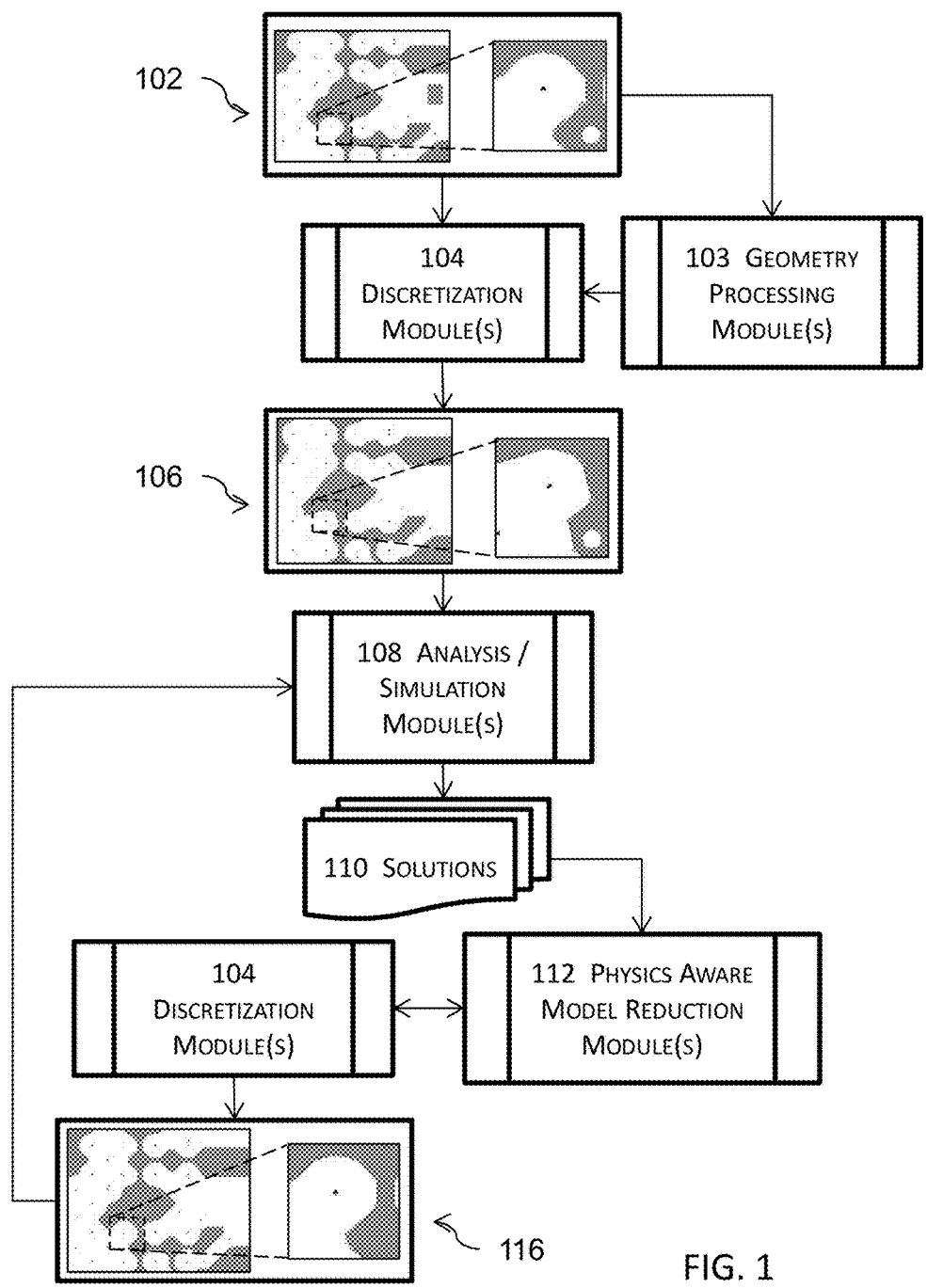
FIG. 1 illustrates a high level block diagram for a system for implementing physics aware model reduction for a three-dimensional design in one or more embodiments.

FIG. 1 illustrates a high level block diagram for a system for implementing physics aware model reduction for a three-dimensional design in one or more embodiments. In these embodiments, a discretization module 104 may receive a design model 102 and discretize the design model 102 into a set of meshes each having a plurality of nodes in the discretized design 106. In some of these embodiments, the design model 102 may be first processed by a geometry processing module or geometry simplification module 103 before the processed design model is forwarded to the discretization module 104.

The geometry processing module 103 may simplify the geometries in the design model, without accounting for the underlying physics or considering the significance or importance of the features in the 3D design model or geometries thereof being simplified. In other words, the geometry processing module 103 is not aware of and does not account for any underlying physics or the physical or electrical characteristic of any features in the design model whose geometries are simplified by the geometry processing module 103.

The discretized design model 106 may then be provided to an analysis or simulation module 108 grounded on the underlying physics to obtain a first solution 110. In this initial discretization of the design model 102 or the simplified design model 103 (e.g., by the geometry processing module 103), the set of meshes may be set to coarse. As a result, the first solution 110 may not provide accurate numerical solutions for the discretized model. Accurate solutions for the discretized design model 106 are not needed at this stage. Rather, one of the purposes of analyzing or simulating the discretized design model 106 having a coarse set of meshes is to establish a spatial distribution for a physical or electrical characteristic (e.g., the electromagnetic or EM field strength at various locations on a layer of an IC or integrated circuit design arising from a charge carrying trace at one level below or above the layer).

With the physics based analysis or simulation module 108, although the absolute numeric values of a characteristic of interest at various points in the design space may be incorrect, the spatial distribution of the characteristic of interest may nevertheless provide a basis for subsequent model reduction. In the above example of EM field strength on a layer caused by a charge carrying trace at one level above or below the layer, an electromagnetic simulation with a coarse set of meshes may provide how the EM field spatially distributes o the layer (e.g., which portion of the layer is subject to a stronger EM field) although the absolute numeric values of the EM field at various locations are not sufficiently accurate.

The first solution 110 may be provided to one or more physics aware model reduction models 112 that may, for example, identify areas or features that are more important or more significant in view of the underlying physics, areas or features that are less important or less significant in light of the underlying physics, and areas or features that may be negligible with the underlying physics from the solution 110. In the aforementioned example of an EM field, a model reduction model may identify areas or features subject to stronger EM field strengths, areas or features subject to moderate EM field strengths, areas or features subject to negligible EM field strengths, etc. The model reduction module may then flag each area with a different simplification scheme and/or discretization scheme.

For example, the model reduction module may label areas corresponding to higher importance or significance with a first label indicative of maintaining all geometric details and possibly refining the set of meshes in these areas. The model reduction module may further label areas corresponding to moderate importance or significance with a second label indicative of simplifying geometric details and possibly coarsening the set of meshes in these areas. The model reduction module may further label areas corresponding to negligible importance or significance with a third label indicative of removing certain geometric details and possibly further coarsening the set of meshes in these areas.

The levels of importance or significance may be determined from the first solution 110. In the aforementioned example involving the EM field, any areas or features therein subject to 5% of the maximum EM field stringing may be labeled as higher importance areas or features; any areas or features therein subject to 0.1% to 5% of the maximum EM field stringing may be labeled as moderate importance areas or features; and any areas or features therein subject to lower than 0.1% of the maximum EM field stringing may be labeled as areas or features with negligible importance or significance.

The physics aware model reduction module 112 may then perform the geometric manipulations in these areas accordingly. For example, the physics aware model reduction module 112 may remove some positive geometric features (e.g., metal fill shapes, etc.) and/or negative geometric features (e.g., holes, apertures, etc.) in the areas corresponding to negligible importance or significance; and the physics aware model reduction module 112 may simplify geometries (e.g., by replacing curved features with curvatures below a certain threshold value with straight features) in areas corresponding to moderate importance or significance, while leaving features in areas corresponding to higher importance or significance intact.

A reduced design model may thus be generated and forwarded to the discretization module 104 which may then adjust the discretization scheme or use a different discretization scheme to discretize the reduced design model to generate another discretized design model 116. This latter discretized design model 116 may then be solved for by the analysis or simulation module 108 until convergence is reached.

One of the advantages of these techniques described herein over conventional approaches is that these techniques first use a coarse set of mesh to obtain a first solution with physics based models in the analysis or simulation module 104 and further use the first solution to reduce the size of the design model before using the analysis or simulation module coupled with the discretization module to fully analyze the design model. Such a full analysis consumes most part of the computational resources in terms of processor cycle times and memory footprint. Therefore, these techniques effectively reduce the utilization of computational resources than conventional approaches that may spend unnecessary computational resources in areas with relatively low importance or significance due to their lack of accounting and hence unawareness of the importance or significance of these areas in light of the underlying physics. These techniques thus adjust the level of resolutions and accuracy of the solution process according to the relative importance or significance of the physical or electrical characteristics, rather than blindly refining and coarsening meshes based on rates of change of a characteristic's value in two adjacent meshes or two immediately neighboring nodes of a discretized model, without accounting for the significance or importance of the physical or electrical characteristics.

Another advantage of these techniques is that these techniques eliminate the subjective determination by domain experts of whether the meshes in certain areas in a design model need to be refined, and the meshes in certain other areas need to be coarsened. These techniques further simplify the geometries in a design model based on the underlying physics and again eliminate the subjective determination, guesses, or guesstimates by domain experts of whether certain geometries may be simplified or removed.

Figure 2:
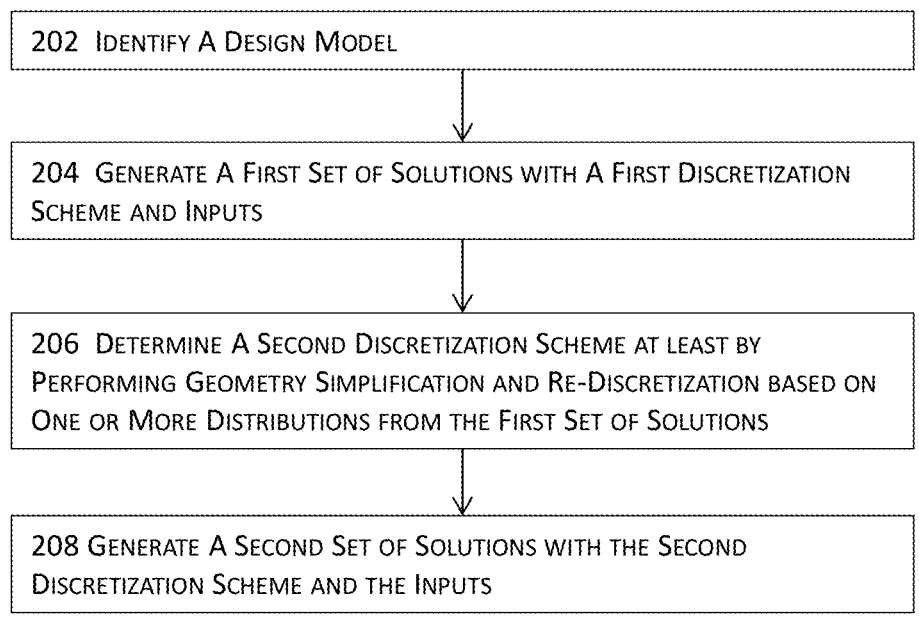
FIG. 2 illustrates a high level flow diagram for implementing physics aware model reduction for a three-dimensional design in one or more embodiments.

FIG. 2 illustrates a high level flow diagram for implementing physics aware model reduction for a three-dimensional design in one or more embodiments. In these embodiments, a three-dimensional (3D) design model may be identified at 202. It shall be noted that although various embodiments and examples are described with a 3D design model, these techniques described herein may apply with full and equal effects to planar (two-dimensional or 2D) design models. A 3D design model may include a design model having geometric features represented in a three-dimensional or two and a half dimensional or pseudo-3D (2.5D) space.

It shall be further noted that that although various examples described in this application refer to 3D electronic designs, these techniques apply with full and equal effects to other designs including, for example, mechanical models, thermal models, fluid models, or any combinations thereof, etc. to provide physics based model reduction, unless otherwise specifically claimed or specified. Therefore, the description of electronic designs, electrical analyses, etc. is not intended to limit the scope of the present disclosure or the scope of the claims, unless other explicitly recited therein.

A first set of solutions for the design model may be generated at 204 with a first discretization scheme and inputs. For example, various properties, constants, initial conditions, boundary conditions, etc. may be identified at 204 ad inputs. A coarse discretization scheme may also be identified at 204 to discretize the design model identified at 202 into a set of coarse meshes. As described above, one of the purposes of these techniques is to establish a spatial distribution for a physical or electrical characteristic for subsequent model reduction, rather than accurate numeric values of the physical or electrical characteristic. As a result, a coarse set of meshes may suffice to establish the spatial distribution while conserving computational resources for later analyses or simulations. In some embodiments, the first discretization scheme may be identified to generate an extremely coarse set of meshes so long as this extremely coarse set of meshes provide one or more spatial distributions for one or more corresponding physical or electrical characteristics in the model for partitioning the design model according to the relative importance or significance indicated in the one or more distributions.

Any numerical methods may be used to generate the first set of solutions. For example, various numerical techniques such as any integral equation solvers (e.g., boundary element methods or method of moments, etc.), any differential equation solvers (e.g., finite element methods, finite difference methods, finite difference time domain methods, etc.), or any other suitable numerical methods may be used to generate the first set of solutions at 204.

A second discretization scheme may be determined at 206 at least by performing geometry simplification and re-discretization of at least a portion of the design model based in part or in whole upon one or more spatial distributions of one or more physical or electrical characteristics determined from the first set of solutions. More specifically, these techniques may partition the design model or the first set of meshes from the first discretization scheme into a plurality of groups according to the relative significance of importance of each of the plurality of groups.

At least some of the plurality of groups may then be subject to geometry simplification based on the importance or significance indicators thereof. The areas corresponding to some of these groups may be subject to mesh refinement (e.g., adaptive mesh refinement), while some other areas (e.g., areas to which geometry simplification is applied) may be subject to mesh coarsening. With the second discretization scheme, a second set of solutions may be generated at 208. Similar to the first set of solutions, the second set of solutions may be generated with any suitable numerical techniques such as the non-limiting examples provided above with respect to the first set of solutions generated at 204.

Figure 3A:
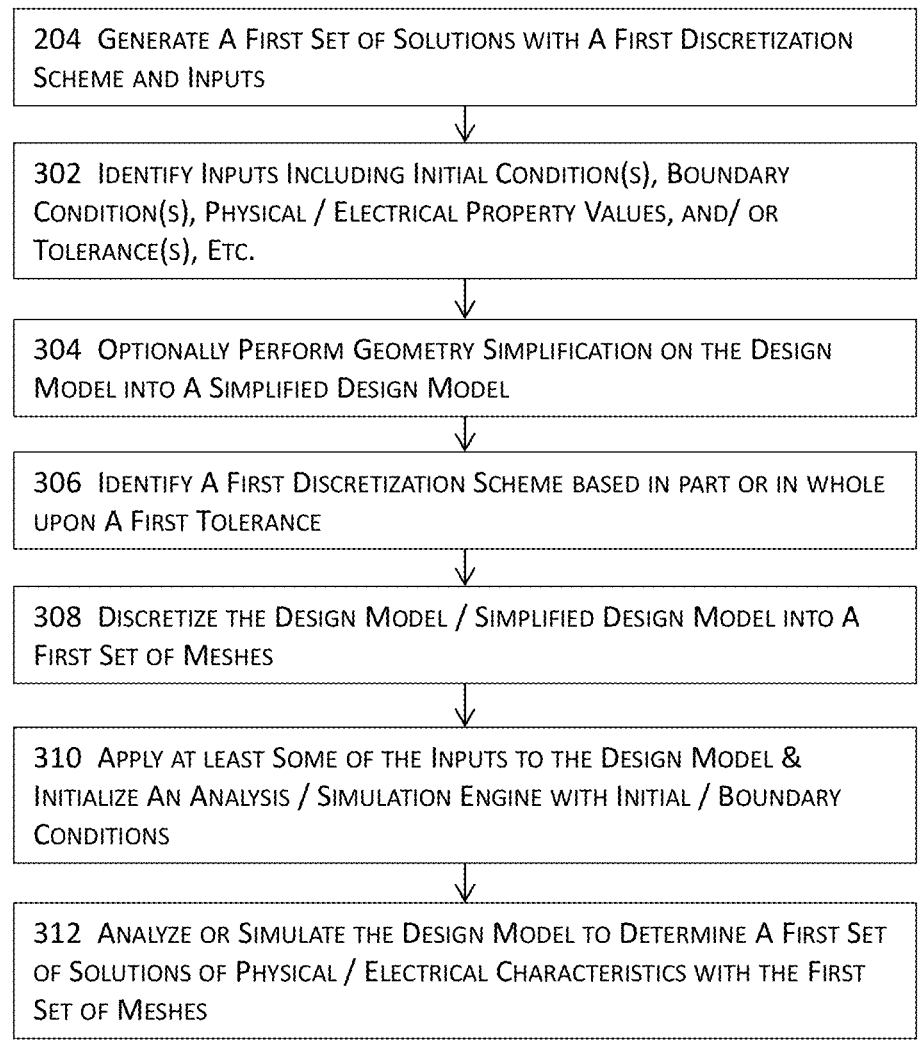
FIG. 3A illustrates more details about a part of the flow diagram illustrated in FIG. 2 for implementing physics aware model reduction for a three-dimensional design in one or more embodiments.

FIG. 3A illustrates more details about a part of the flow diagram illustrated in FIG. 2 for implementing physics aware model reduction for a three-dimensional design in one or more embodiments. More specifically, FIG. 3A illustrates more details about generating a first set of solutions at 204 of FIG. 2. In these embodiments, inputs for characterizing the design model identified at 202 may be identified at 302. These inputs may include, for example, initial conditions, boundary conditions, physical and/or electrical property values, constants, etc. In some embodiments, one or more tolerances may also be identified at 302.

These one or more tolerances may include, for example, one or more tolerance values on the size of meshes (e.g., the smallest height from one node to its corresponding side of a mesh), one or more attributes of meshes (e.g., the smallest or largest internal angle of a mesh), maximum permissible curvature of a curved segment to be represented as a straight line segment, or any other suitable tolerances based on the balance of the accuracy requirements and performance, etc.

Geometry simplification may be optionally performed on the design model at 304 to simplify the design model into a simplified design model. At this stage, the geometry simplification is performed without regard to the underlying physics or any importance or significance of any physical or electrical characteristics of the design model and is thus distinguishable from the subsequent model reduction. A first discretization scheme may be identified at 306 based in part or in whole upon a first tolerance of the one or more tolerances.

This first tolerance may be referenced to determine how coarse the design model (or the simplified design model with the optional geometry simplification) is to be discretized.

With the first discretization scheme identified at 306, the design model (or the optional simplified design model) may be discretized into a first set of meshes at 308. As described above, one of the purposes of these techniques is to establish one or more spatial distributions for one or more corresponding physical or electrical characteristics for subsequent model reduction, rather than accurate numeric values of these one or more physical or electrical characteristics. As a result, a coarse set of meshes may suffice to establish the one or more spatial distributions while conserving computational resources for later analyses or simulations.

An analysis or simulation engine may be initialized, and at least some of the inputs may then be applied to the first set of meshes of the design model (or the optional simplified design model) at 310. For example, the boundary conditions, property values, constants, etc. may be applied to the first set of meshes of the design model. The discretized design model (or the optional simplified design model) may be analyzed or simulated at 312 to generate a first set of solutions of physical or electrical characteristics with the first set of meshes. The numeric values in the first set of solutions are less important than the general spatial distributions of various characteristics across the design model in some embodiments because subsequent model reduction techniques reference the relative distributions of these characteristics, not their absolute numeric values.

Figure 3B:
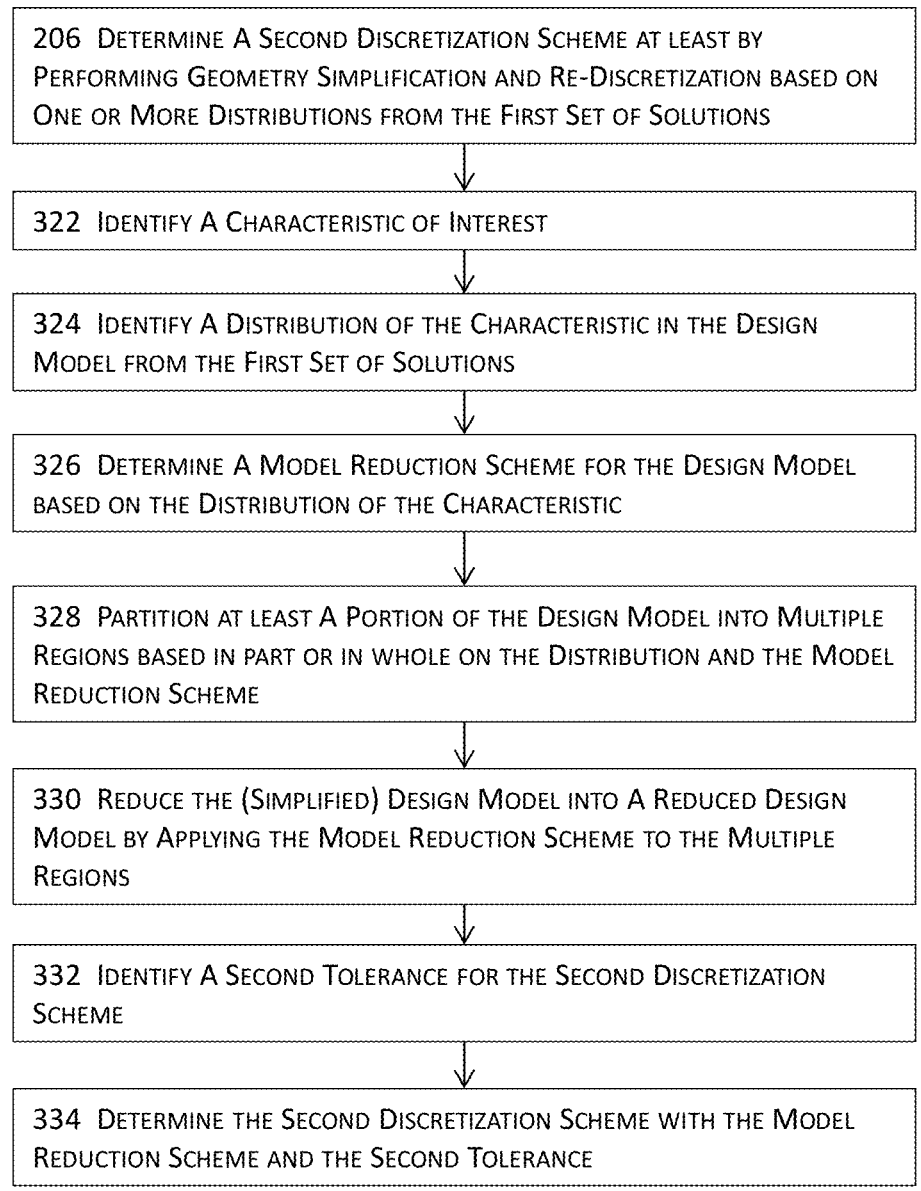
FIG. 3B illustrates more details about another part of the flow diagram illustrated in FIG. 2 for implementing physics aware model reduction for a three-dimensional design in one or more embodiments.

FIG. 3B illustrates more details about another part of the flow diagram illustrated in FIG. 2 for implementing physics aware model reduction for a three-dimensional design in one or more embodiments. More specifically, FIG. 3B illustrates more details about determining a second discretization scheme at 206 of FIG. 2. In these embodiments, a characteristic of interest may be identified at 322; and a distribution (e.g., a spatial distribution) of the characteristic of interest may be identified or derived at 324 from the first set of solutions. For example, the spatial distribution of the magnetic field across a layer of an IC design may be identified at 324 despite that the numeric values of the magnetic field strength may not be sufficiently accurate given the coarse set of meshes for the design model.

A model reduction scheme may be determined at 326 based in part or in whole upon the distribution of the characteristic of interest. For example, a model reduction scheme that employs geometry reduction techniques with two or more levels of aggressiveness for corresponding regions of the design model may be identified at 326.

The model reduction scheme effectively reduces the computational resource utilization because a reduced model leads to a fewer of meshes for the design model and thus needs less CPU (central processing unit) time and memory. For example, solving the Maxwell's equations with differential equation techniques (e.g., finite element method, finite difference time domain techniques, etc.) for an electronic design requires at least O(N) CPU time and memory, where N denotes the number of meshes for the design model of the electronic design. As a result, the model reduction techniques described herein lead to a fewer number of meshes and thus require less CPU time and memory.

At least a portion of the design model may be partitioned at 328 into multiple regions based in part or in whole upon the distribution of the characteristic of interest and the model reduction scheme identified at 326. For example, a model reduction scheme may include four different sets of reduction techniques, and at least a portion of the design model may thus be partitioned into four different regions at 328 accordingly.

The design model (or the optional simplified design model) may be reduced at 330 into a reduced design model by applying the model reduction scheme to the multiple regions. For example, a curved segment may be reduced to a number of straight segments; a circular shape may be reduced to a convex polygon; a negative feature such as two- or three-dimensional hole or aperture may be removed; a positive feature such as a floating metal fill shape may be removed; etc.

One or more tolerances may be identified at 332 for the second discretization scheme. In some embodiments, a tolerance may be identified at 332 for each region of the multiple regions determined at 328 based in part or in whole upon the model reduction scheme. For example, a first region corresponding to relatively higher importance or significance may be associated with a smaller tolerance, whereas a second region corresponding to relatively lower importance or significance may be associated with a larger tolerance. These one or more tolerances may be referenced to guide the discretization module to partition the multiple regions into the corresponding sets of uniform or non-uniform meshes of one or more shapes (e.g., triangular meshes, quadrilateral meshes, etc.) In some embodiments, the second discretization scheme may then be determined at 334 with the model reduction scheme and the one or more tolerances.

Figure 3C:
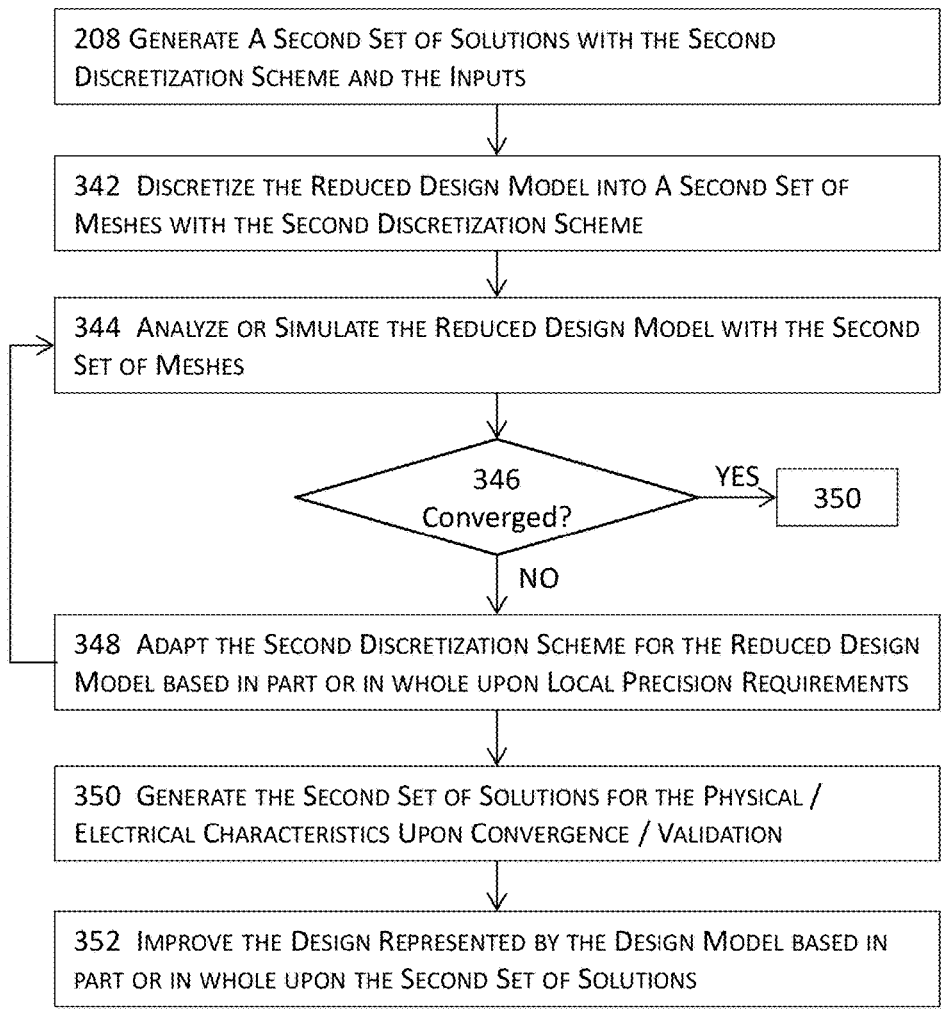
FIG. 3C illustrates more details about another part of the flow diagram illustrated in FIG. 2 for implementing physics aware model reduction for a three-dimensional design in one or more embodiments.

FIG. 3C illustrates more details about another part of the flow diagram illustrated in FIG. 2 for implementing physics aware model reduction for a three-dimensional design in one or more embodiments. More specifically, FIG. 3C illustrates more details about generating the second set of solutions at 208 of FIG. 2. In these embodiments, the reduced design model may be discretized at 342 into the second set of meshes with the second discretization determined at 334 of FIG. 3B. The model reduction techniques described herein may associate each region of the multiple regions with a corresponding tolerance that may then be referenced to guide the discretization module to discretize the region accordingly. For example, a discretization module may discretize a first region associated with a relatively smaller tolerance into a set of finer meshes, while a discretization module may discretize a second region associated with a relatively larger tolerance into a set of coarser meshes.

The discretized, reduced design model may be analyzed or simulated at 344 with, for example, one or more physics based models and the second set of meshes to solve for one or more static or transient physical and/or electrical characteristics of interest in the design model. As described above, various techniques such as the integral equation techniques, the differential equation techniques, etc. may be used to analyze or simulate the reduced design model.

As is often the case, the analysis or simulation process may be iterative and perhaps involve time stepping techniques in transient analyses. The solutions to the one or more static or transient physical and/or electrical characteristics of interest may be examined to determine whether the solutions have converged at 346. If the solutions have converged, the process flow may proceed to 350 that is described in greater details below. If the solutions have not converged at 346, the second discretization scheme may be adapted at 348 for the reduced design model based in part or in whole upon the local precision requirements. For example, adaptive mesh refinement techniques may be employed at 348 to refine the second set of mesh in one area of the reduced design model requiring a higher precision and/or coarsen the second set of mesh in another area of the reduced design model requiring a lower precision according to the rates of change in the one or more physical and/or electrical characteristics of interest in these respective areas.

The process may then return to 344 to repeat the analysis or simulation process at 344 and the examination of whether one or more convergence criteria have been satisfied at 346 until the one or more convergence criteria are satisfied. The second set of solutions may then be generated for the one or more physical or electrical characteristics at 350 upon convergence. In some embodiments where the analysis or simulation aims to perform computational electromagnetics, the second set of solutions may be validated before the second set is generated as the final set of solutions.

Validation serves to determine whether the solutions for the one or more physical or electrical characteristics are accurate, or how accurate the solutions for the one or more physical or electrical characteristics are. Various validation techniques may be utilized at 350 to validate the solutions for computational electromagnetics and are not intended to limit the scope of the present disclosure or that of the claims, unless otherwise specifically recited or stated. For example, the solutions obtained from the example flow illustrated in FIG. 3C may be compared to the results of analytical formulations of an isolated case for which analytical formulations may be determined in some embodiments.

In some other embodiments, the solutions may be compared to measurement results or to other analysis or simulation results obtained with a different analysis or simulation technique. The design represented by the design model may then be improved at 352 based in part or in whole upon the second set of solutions. For example, various modifications may be performed to modify the underlying design in response to the second set of solutions that may indicate certain features as violating one or more design requirements, constraints, or rules. These improvements or modifications at 352 are to ready the underlying design for manufacturing. For example, an electronic design may be modified to rid violations of certain rules, requirements, or constraints according to the second set of solutions so that the electronic design may be more suited for manufacturing related tasks such as various optimizations, tapeout, etc.

Strictly as an example, the spatial distribution for the electric field and the spatial distribution for the pseudovector magnetic field caused by a nearby charge carrying trace or interconnect may be determined as the first set of solutions for a layer of electronic design with a coarse set of meshes. This layer of the electronic design may then be partitioned into, for example, three regions. The first region may correspond to the portion of the layer where the electric field strength is greater than bottom 2% from the spatial distribution of the electric field. The second region may correspond to the portion of the layer where the electric field strength is less than 2% and greater than 0.05% from the spatial distribution of the electric field. The third region may correspond to the portion of the layer where the electric field strength is less than 0.05% from the spatial distribution of the electric field.

In this example, the model reduction module may indicate that the first region may be of higher importance or significance due to the more significant electric field present in the first region from the first set of solutions. This first region may then be maintained without any or with minimal geometry simplification (e.g., eliminating extremely small features) so that a full electrical analysis or simulation may be performed to characterize various characteristics in this region. The model reduction module may further designate the second region to be of moderate significance or importance and apply heavier geometry simplification. For example, the model reduction module may represent a circular feature as a quadrilateral shape in the second region. The model reduction module may also designate the third region to be of low significance or importance and apply more aggressive geometry simplification including, for example, representing a curve with larger curvature as a straight segment, removing positive features and/or negative features, etc. The model reduction module thus reduces the design model into a reduced design model that has a smaller size than the original design model prior to reduction.

This reduced design model may then be forwarded to the discretization module and the analysis or simulation engine that iteratively solves the discretized reduced design model for one or more physical or electrical characteristics of interest. In this example, the geometries of a design model is simplified, and the design model is adaptively meshed based at least in part upon the significance or importance of the physical or electrical characteristics in different portions of the design model according to the underlying physics, instead of merely considering whether the local rate of change in a characteristic (e.g., the gradient of the characteristic) exceeds some threshold regardless of whether the characteristic is of sufficient importance or significance in that local region in conventional approaches.

Figure 4A:
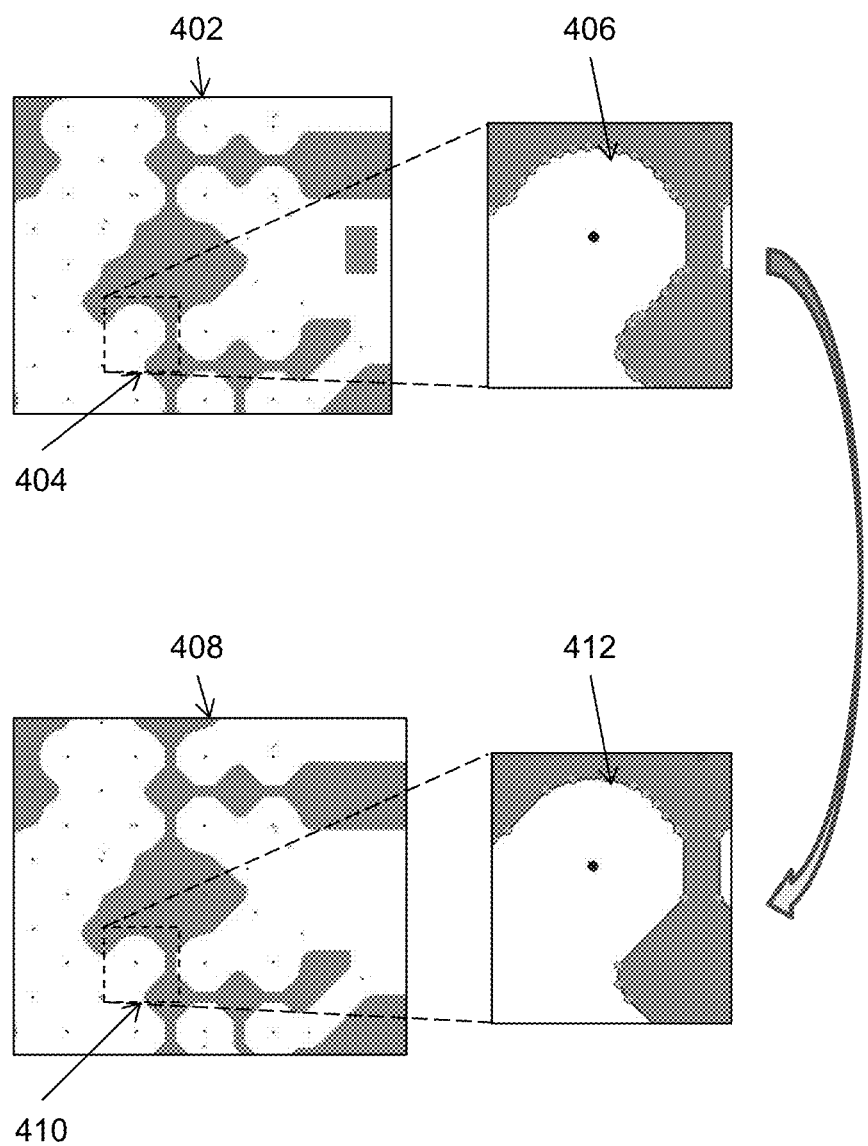
FIGS. 4A-4D illustrate some examples of applying certain techniques described herein to simplify integrated circuit designs in some embodiments.

FIGS. 4A-4D illustrate some examples of applying certain techniques described herein to simplify integrated circuit designs in some embodiments. More specifically, FIG. 4A illustrates a portion of an example electronic design where the original design model 402 having fine geometric details such as the curves 406 shown in the zoom-in window 404.

Based on the importance or significance of this portion of the example electronic design, different tolerances may be referenced in discretizing this portion. 408 represents the design model for the same portion that is processed with a tolerance of 0.0127 mm. That is, the discretization scheme does not generate any meshes whose height is smaller than 0.0127 mm. With this tolerance of 0.0127 mm, this portion 408 may be modeled with fewer geometric details through, for example, the model reduction techniques described above. For example, the curves in window 410 may be approximated with a fewer number of segments 412. According to some numerical experiments, this portion 408 may be analyzed with techniques described herein with about 149,000 elements in the initial, coarse set of meshes and about 350,000 elements in the second set of meshes that produce converged results.

Figure 4B:
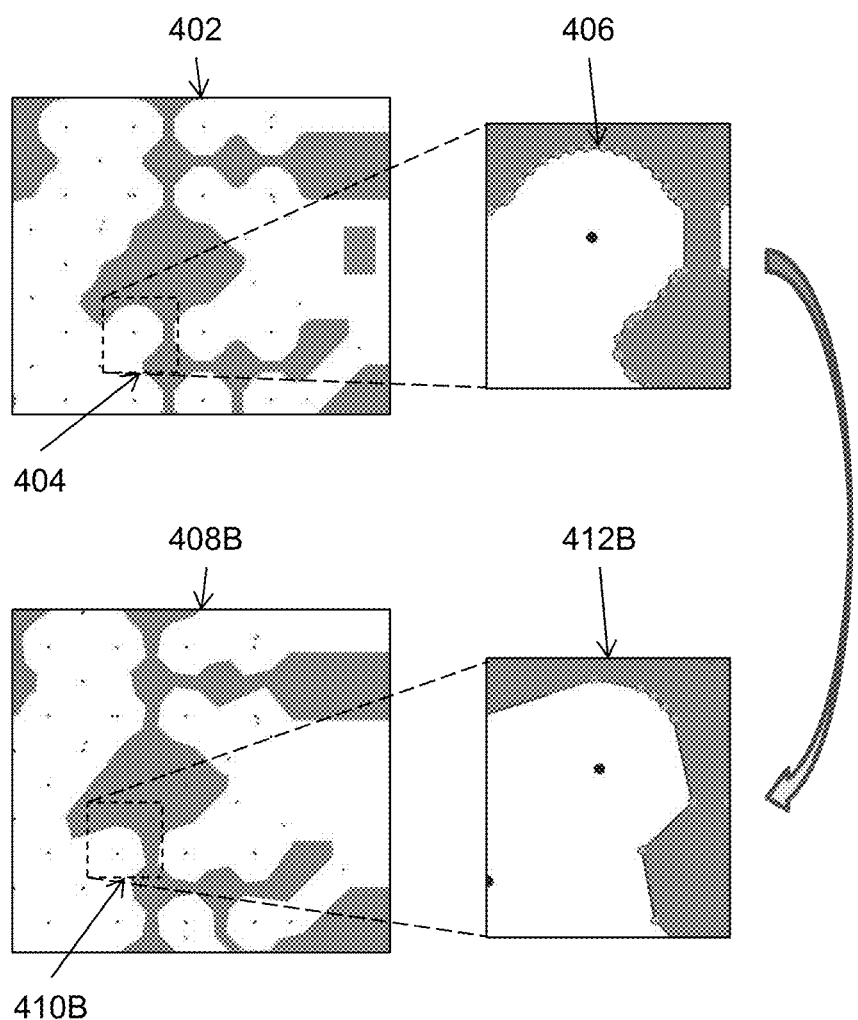

FIG. 4B illustrates the same portion of the electronic design as that in FIG. 4A. Moreover, based on the importance or significance of this portion of the example electronic design, different tolerances may be referenced in discretizing this portion. 408B represents the design model for the same portion that is processed with a tolerance of 0.05 mm. That is, the discretization scheme does not generate any meshes whose height is smaller than 0.05 mm. With this tolerance of 0.05 mm, this portion includes even fewer geometric details than that illustrated in FIG. 4A. For example, the curves in window 410B are approximated with an even smaller number of segments 412B. According to some numerical experiments, this portion 408B may be analyzed with techniques described herein with about 90,000 elements in the initial, coarse set of meshes and about 200,000 elements in the second set of meshes that produce converged results. In some embodiments where a differential equation solver is used, these techniques described herein achieved at least 43% saving in computational resources with the model illustrated in 408B that the model illustrated in 408 of FIG. 4A.

Figure 4C:
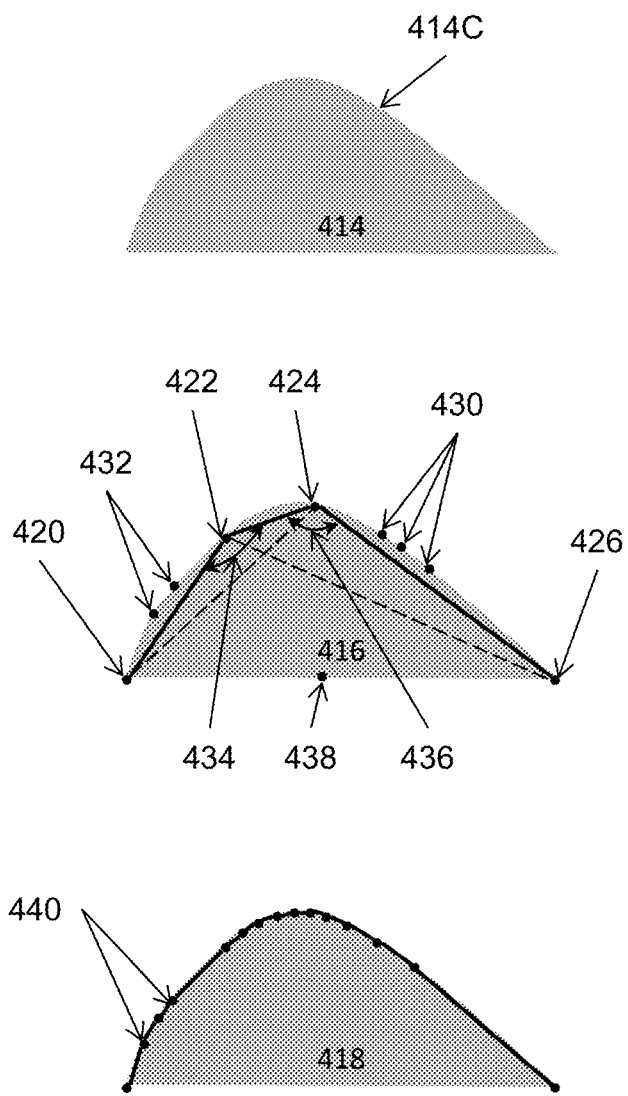

FIG. 4C illustrates another example to which some techniques described herein may be applied in one or more embodiments. In this example, a shape 414 may be subject to different model reduction techniques and hence different discretization results. Based on the importance or significance of this shape with respect to one or more characteristics, the same shape 414 may be associated with different tolerances for discretization. In an example where this shape 414 is located in a region associated with relatively lower importance or significance, a larger tolerance may be referenced in discretizing shape 414.

For example, a relatively large permissible value may be associated with the region where shape 414 is located. With this relatively large permissible value, larger deviations from the points (e.g., 430 and 432) along the curved segment of the shape to the approximating straight segment (e.g., the segment between nodes 420 and 422, the segment between nodes 422 and 424, the segment between nodes 424 and 426) may be allowed. As a result, the curved segment may be reduced to a fewer number of straight segments, and the shape 414 may thus be modeled with a fewer number of nodes along the curved segment to result in a fewer number of meshes as shown in 416. On the other hand, if the shape 414 is located in a region associated with higher significance or importance, a relatively small value may be associated with the shape 414. In this latter case, more nodes 440 may be used to model the curve segment, and the shape may thus be discretized with a larger number of meshes as shown in 418.

As another example, a different tolerance governing the largest internal angle (or the smallest internal angle) of a mesh may be used. The largest internal angle (or the smallest internal angle) affects the numerical stability of the analysis or simulation engine and may thus be used as a tolerance for the discretization schemes. If the shape is of relatively low importance or significance, a relative small largest internal angle may be associated with discretizing shape 414. For example, the internal angles (e.g., 434 and 436) formed by three neighboring nodes may be controlled to be smaller than a predetermined maximal angle, larger than a predetermined minimal angle, or within a range capped by the permissible maximal angle and the permissible minimal angle. As a result of this relative small largest internal angle that cannot be exceeded in discretizing the shape 414, only a fewer number of nodes may be created to approximate the curve segment 414C, and thus a fewer number of meshes may be generated to approximate the shape as illustrated by 416.

In some of these embodiments, one or more additional nodes (e.g., 438) may be introduced along an edge although this edge may be geometrically simple (e.g., a straight edge) that needs not be represented by more than one edge. In these example, the introduction of these one or more angles may be used to enable further discretization to provide higher resolution and hence accuracy. For example, if the internal angle 434 and 436 are determined to be larger than the maximal permissible angle, an additional node 438 may be introduced along the straight edge of shape 416 so that the internal angle 434 may be split into two or more smaller, permissible angles. Similarly, the internal angle 434 may be split into two or more smaller, permissible angles with the additional node 438.

Figure 4D:
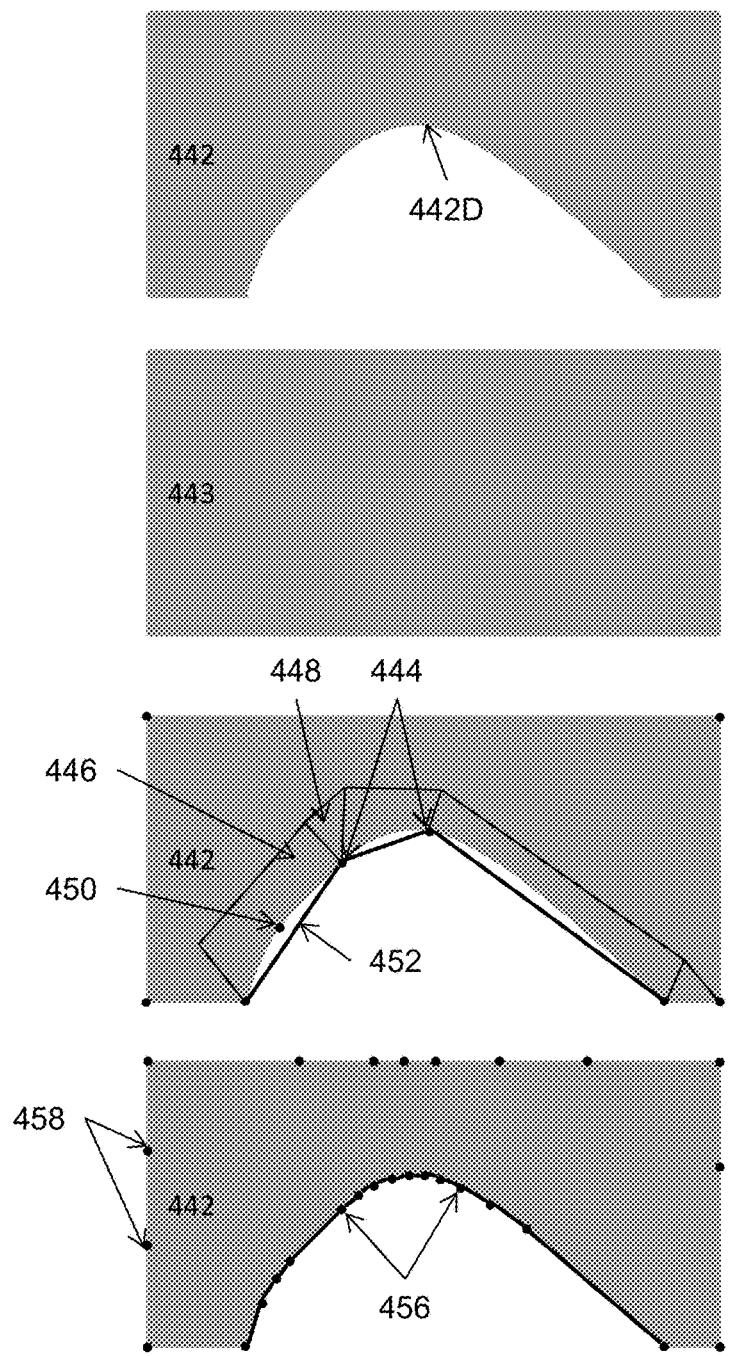

FIG. 4D illustrates another example to which some techniques described herein may be applied in one or more embodiments. In this example, a shape 442 having a cutout with a curved segment 442D may be subject to different model reduction techniques and hence different discretization results. In some embodiments where the shape 442 is determined to have negligible importance or significance with respect to one or more electrical or physical characteristic as described above, the cutout portion (a negative feature) may be completely removed so the shape 442 may be modeled as a rectangular (in the 2D sense) shape 443. In some embodiments where the shape 442 is determined to have negligible importance or significance with respect to one or more electrical or physical characteristic, even the entire shape 442 (a positive feature) may be eliminated or discarded in its entirety. In some embodiments, any removed positive and/or negative features or shapes may be stored in a scratch pad (e.g., a temporary data structure stored in a block of random access memory) and may be restored subsequently in the event that subsequent analyses or discretization requires or desires to have such features or shapes restored.

In some embodiments where the shape 442 is determined to have moderate importance or significance with respect to one or more electrical or physical characteristic, shape 442 may be associated with a first tolerance (e.g., a relative large tolerance between a point 450 on the curved segment 442D and the approximating straight segment 452, etc.) for the discretization of the shape 442. In this example, the curved segment 442D in the shape 442 may be discretized into a fewer number of nodes 444 that lead to a fewer number of meshes (e.g., 446, 448, etc.) for the shape 442.

In some embodiments where the shape 442 is determined to have higher importance or significance with respect to one or more electrical or physical characteristic, the curved segment 442D in the shape 442 may be discretized into a larger number of nodes 456 that lead to a fewer number of meshes for the shape 442. FIG. 4D also illustrates that the originally straight segments may be further discretized with one or more additional nodes in addition to the corner nodes to, for example, maintain the integrity of the final meshes or numerical stability. In addition or in the alternative, FIG. 4D further illustrates the possibility of mixing different mesh shapes (e.g., a triangular mesh 448 and a quadrilateral mesh 446) in the discretization of one shape or feature. In some embodiments, one or more additional nodes (e.g., 458) may be introduced along one or more edges of a shape to control the discretization (e.g., to increase mesh density) despite the fact that these one or more edges may not necessarily be required to be further discretized.

Figure 5A:
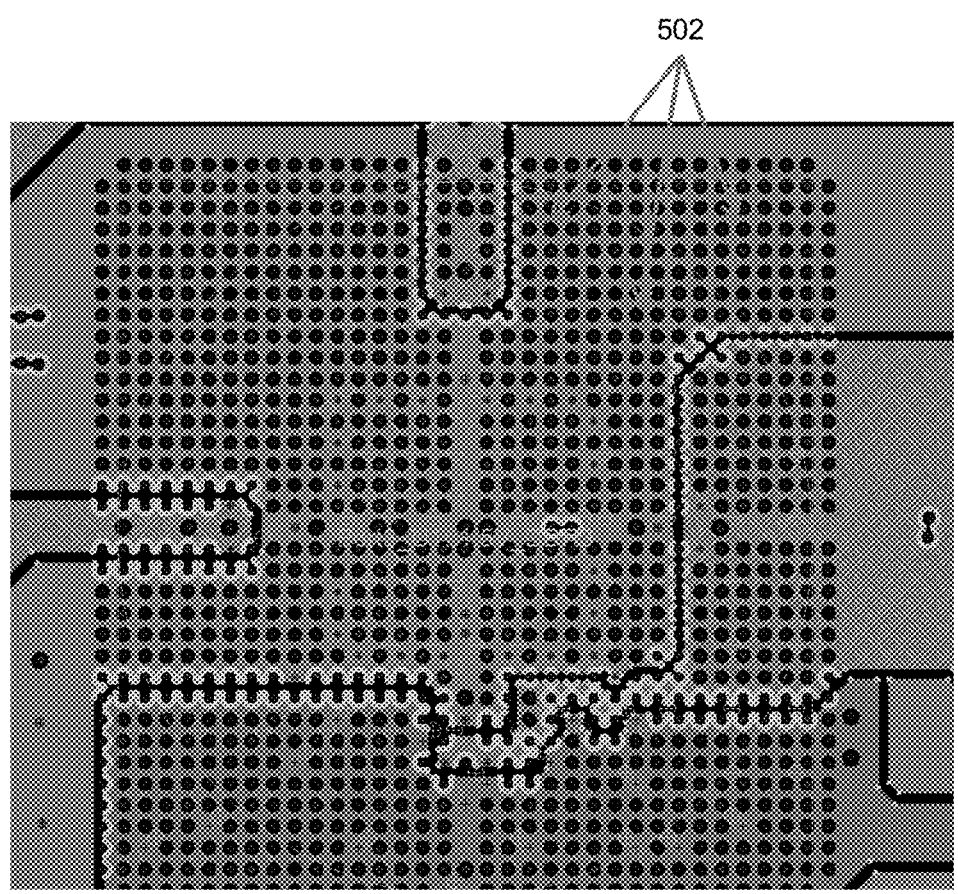
FIG. 5A illustrates an example of a portion of an electronic design having a plurality of negative features to which some techniques described herein may apply in some embodiments.

FIG. 5A illustrates an example of a portion of an electronic design having a plurality of negative features 502 (e.g., holes, apertures, etc.) to which some techniques described herein may apply in some embodiments. As described above, the model reduction techniques described herein may be employed to determine whether the plurality of negative features 502 is to be modeled, and if so, how the plurality of negative features 502 is to be modeled. For example, one or more of the plurality of negative features 502 may be eliminated or discarded in the design model when these one or more negative features are determined to be of relatively lower importance or significance. At least one negative feature may be simplified (e.g., modeled as a square hole) when this at least one negative feature is determined to be of moderate importance or significance.

Figure 5B:
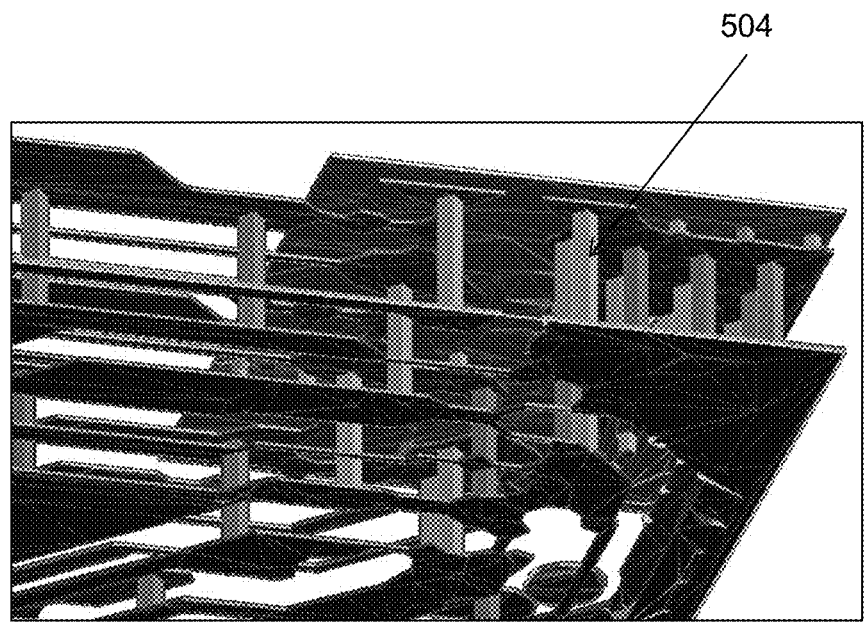
FIG. 5B illustrates an example of a portion of an electronic design having a plurality of positive features to which some techniques described herein may apply in some embodiments.

FIG. 5B illustrates an example of a portion of an electronic design having a plurality of positive features 504 (e.g., vias, etc.) to which some techniques described herein may apply in some embodiments. In this example, the plurality of vias 504 are modeled as cuboids. This cuboid modeling may indicate that the plurality of positive features 504 are determined to be of moderate importance or significance with a physics based analysis or simulation using a coarse set of meshes.

Figure 6A:
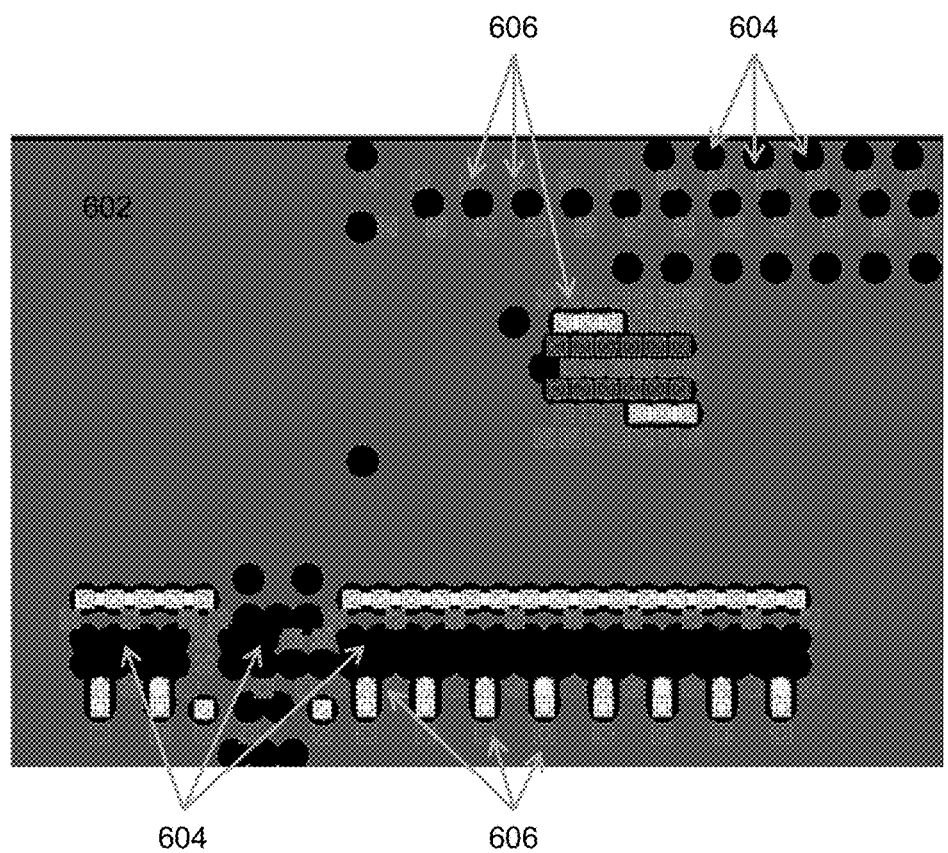
FIGS. 6A-6C jointly illustrate an example of some techniques for implementing physics aware model reduction for a three-dimensional design in one or more embodiments.
Figure 6B:
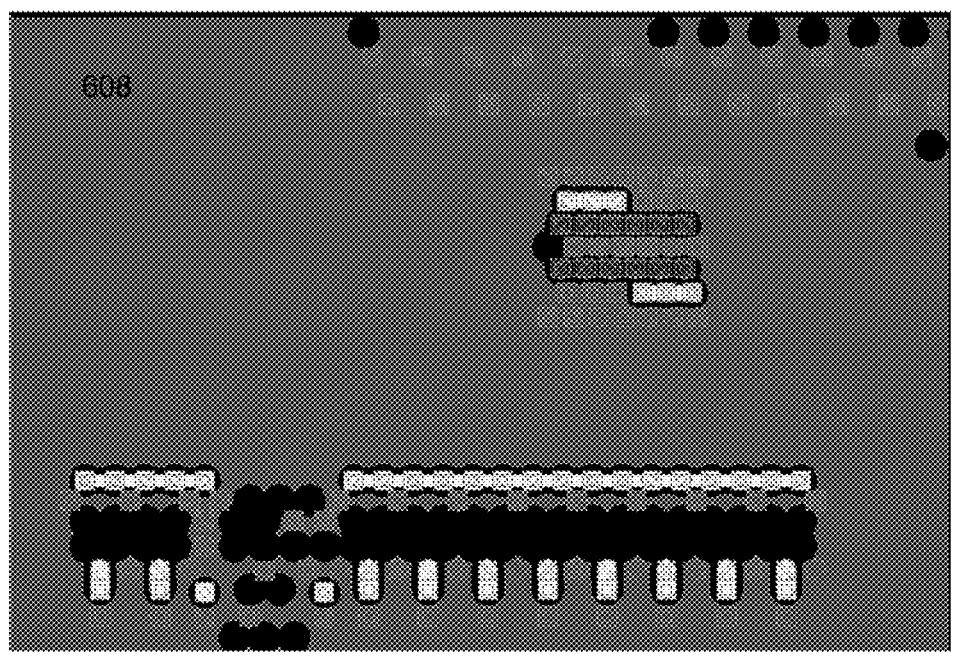

FIG. 6A illustrates an example of an original design model having a plurality of features to which some techniques described herein may apply in some embodiments. More specifically, the original design model 602 includes a plurality of negative features (e.g., holes or apertures) 604 as well as a plurality of positive features 606 (e.g., vias). FIG. 6B illustrates the application of model reduction techniques to the original design model based on a physics based analysis or simulation in some embodiments. In FIG. 6B, some of the plurality of negative features 604 are eliminated or discarded from the design model. As a result, the original design model 602 may be reduced to a first reduced design model 608 illustrated in FIG. 6B.

Figure 6C:
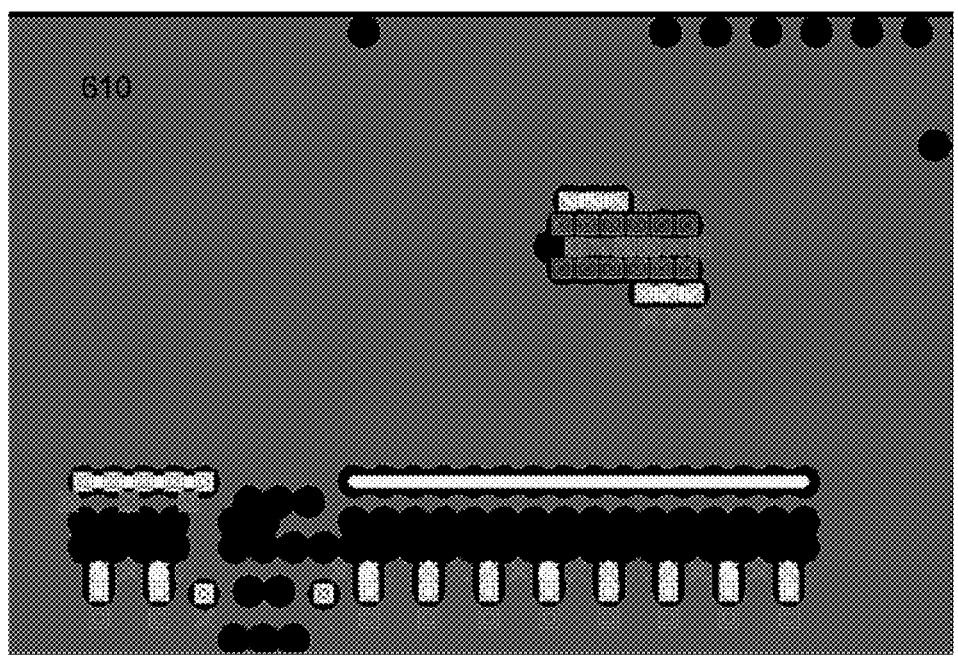

FIG. 6C illustrates a further application of model reduction techniques to a design model based on a physics based analysis or simulation in some embodiments. More specifically, FIG. 6C illustrates the further application of model reduction techniques that remove some of the plurality of positive features 606. As a result of this further application of model reduction techniques, the first reduced design model 608 may be further reduced to the second reduced design model 610 illustrated in FIG. 6C. It shall be noted that the model reduction techniques described herein not only removes positive and/or negative features or shapes in a design model but also affect how features and shapes are modeled in the design model. In addition, model reduction techniques also affect how a discretization module discretizes a design model or a portion thereof, based in part or in whole upon the physics based or solution driven analysis results.

Figure 7:
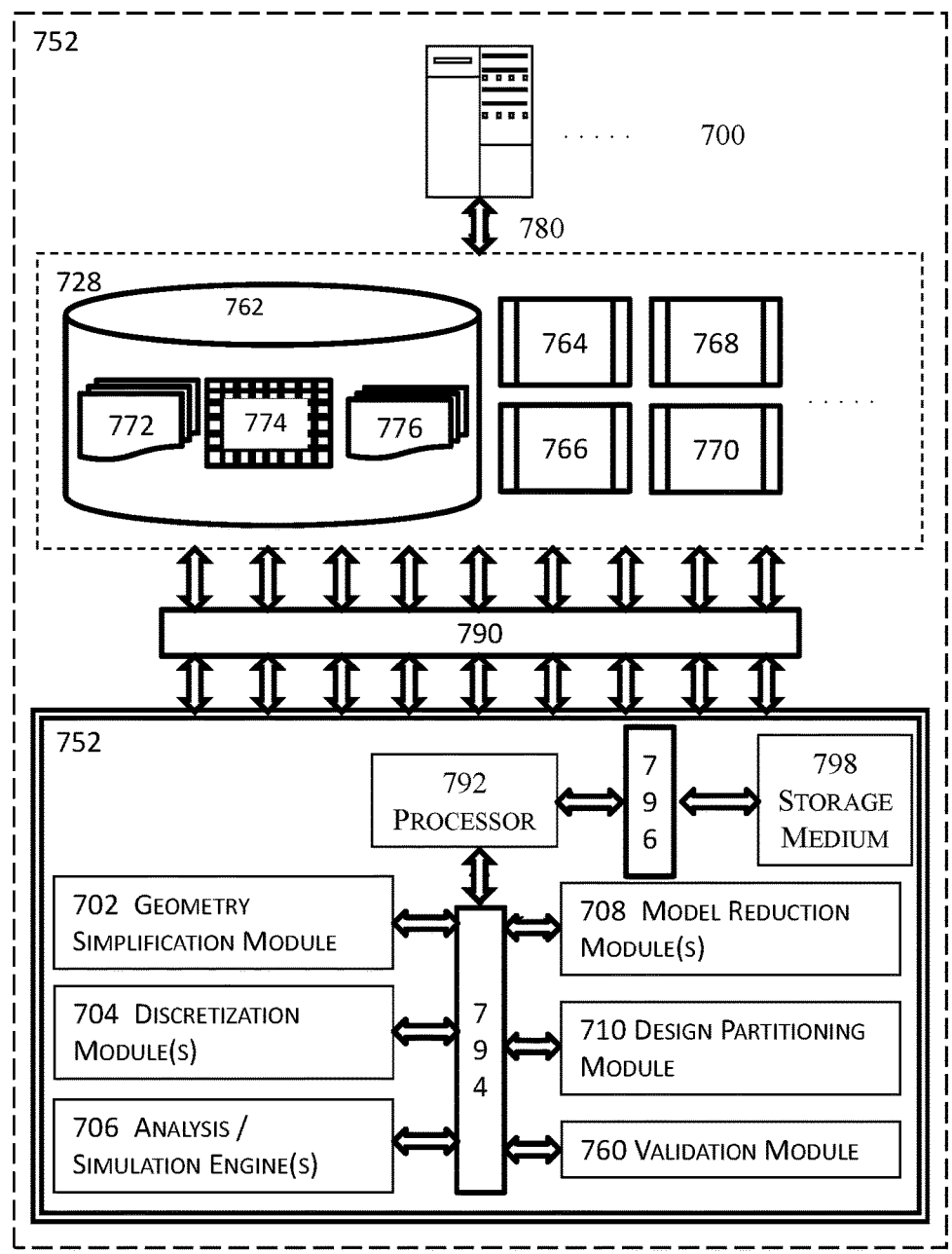
FIG. 7 illustrates a simplified block diagram for a system for implementing physics aware model reduction for a three-dimensional design in one or more embodiments.

FIG. 7 illustrates an example of a portion of an electronic design to which some techniques described herein may apply in one or more embodiments. More specifically, FIG. 7 illustrates an illustrative high level schematic block diagrams for a system for implementing physics aware model reduction for a three-dimensional design and may comprise one or more computing systems 700, such as a general purpose computer described in the System Architecture Overview section to implement one or more special proposes. The illustrative system in FIG. 7 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 7 may be located in a cloud computing platform in some embodiments.

In some embodiments, the one or more computing systems 700 may invoke various system resources such as the processor(s) or processor core(s), memory, disks, etc. The one or more computing systems 700 may also initiate or interact with other computing systems to access, via a computer bus architecture (e.g., a system bus, a control bus, a data bus, or any combinations thereof), various resources 728 that may comprise a floorplanner, a global routing engine, and/or a detail routing engine 764, a layout editor 766, a design rule checker 768, a verification engine 770, etc.

The one or more computing systems 700 may further write to and read from a local or remote non-transitory computer accessible storage 762 that stores thereupon data or information such as, but not limited to, one or more databases (774) such as schematic design database(s) or physical design database(s), electronic circuit design specification database(s), various statistics, various data, rule decks, various design rules, constraints, etc. (772), or other information or data (776) that may be used to facilitate the performance of various functions to achieve the intended purposes.

In some embodiments, the one or more computing systems 700 may include or, either directly or indirectly through the various resources 728, invoke a set of modules 752 including hardware modules and software modules or combinations of one or more hardware modules and one or more software modules that may comprises one or more geometry simplification modules 702 that simplify geometries of a 3D design model without accounting for the underlying physics or considering the significance or importance of the features in the 3D design model or geometries thereof being simplified, one or more discretization modules 704 that discretize a two-dimensional or three-dimensional design model into a set of uniform or non-uniform meshes, elements, or grids (collectively meshes) in one or more geometric shapes (e.g., any convex polygonal shapes having three or more sides in a two-dimensional design model or. any convex polyhedron shapes having four or more faces in a three dimensional design model).

These one or more discretization modules 704 may adaptively adjusting the accuracy of a solution within certain regions of simulation or analysis, dynamically and during the time the solution is being calculated. For example, the one or more discretization modules 704 may be configured to provide a dynamic programming environment for adapting the precision of the numerical computation based on the requirements of the physical problem to be solved in specific areas of a two- or three-dimensional model which need precision while leaving the other areas of the two- or three-dimensional model at one or more lower levels of precision and resolution.

The set of modules 752 may further optionally include one or more analysis or simulation engines 706 to perform various static and/or transient electromagnetic, thermal, mechanical, fluid, etc. types of analyses or simulations, or any combinations thereof. The set of modules 752 may also include a plurality of model reduction modules 708 to reduce the size of a two- or three-dimensional design model by, for example, removing positive and/or negative features in one or more first portions of the design model, adjusting mesh densities, mesh sizes, and/or mesh shapes in one or more second portions of the design model, etc.

The set of modules 752 may also include one or more design partitioning modules 710 to partition a design model or a set of meshes into two or more classes. For example, a design partitioning module 710 may partition a design model into a first portion in which a finer set of meshes or a finer set of nodes is going to be generated, a second portion in which a coarser set of meshes or a coarser set of nodes is going to be generated, a third portion in which certain positive and/or negative features are going to be eliminated or discarded, etc. In addition or in the alternative, this set of modules 752 may include one or more validation modules 760 to determine whether the analysis or simulation results from, for example, the one or more analysis or simulation engines 706 are accurate or how accurate the analysis or simulation results may be.

A validation module described herein may, for example, compare the analysis or simulation results with those of analytical formulations of a simplified or isolated case for which analytical formulations may be determined to determine whether the analysis or simulation results are accurate or how accurate the analysis or simulation results may be. As another example, a validation module may perform cross comparisons between two or more different codes (e.g., code by the finite element solver, code by the integral equation solver, etc.) or compare the analysis or simulation results with measurement data to determine whether the analysis or simulation results are accurate or how accurate the analysis or simulation results may be.

In some embodiments, the computing system 700 may include the various resources 728 such that these various resources may be invoked from within the computing system via a computer bus 780 (e.g., a data bus interfacing a microprocessor 792 and the non-transitory computer accessible storage medium 798 or a system bus 790 between a microprocessor 792 and one or more engines in the various resources 728). In some other embodiments, some or all of these various resources may be located remotely from the computing system 700 such that the computing system may access the some or all of these resources via a computer bus 780 and one or more network components.

The computing system may also include one or more modules in the set of modules 752. One or more modules in the set 752 may include or at least function in tandem with a microprocessor 792 via a computer bus 794 in some embodiments. In these embodiments, a single microprocessor 792 may be included in and thus shared among more than one module even when the computing system 700 includes only one microprocessor 792. A microprocessor 792 may further access some non-transitory memory 798 (e.g., random access memory or RAM) via a system bus 796 to read and/or write data during the microprocessor's execution of processes.

System Architecture Overview

Figure 8:
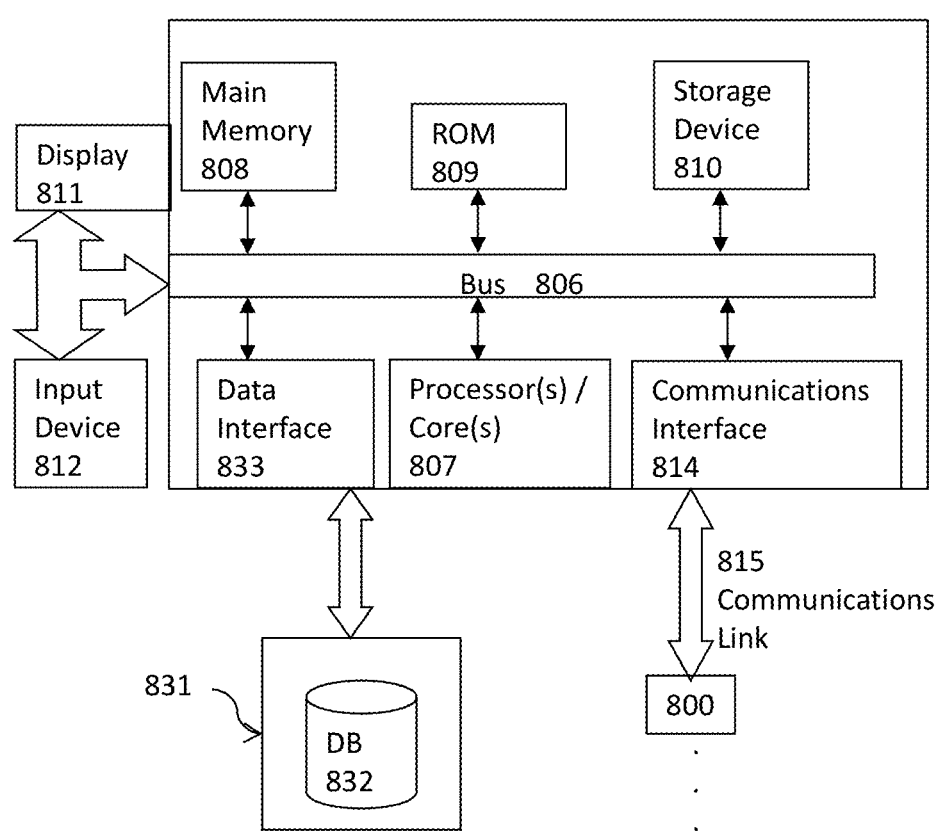
FIG. 8 illustrates a computerized system on which a method for implementing physics aware model reduction for a three-dimensional design in one or more embodiments may be implemented.

FIG. 8 illustrates another example of a portion of an electronic design to which some techniques described herein may apply in one or more embodiments. The illustrative computing system 800 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 800 may include or may be a part of a cloud computing platform in some embodiments. Computer system 800 includes a bus 806 or other communication module for communicating information, which interconnects subsystems and devices, such as processor 807B, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment, computing system 800 performs specific operations by one or more processor or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 807, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814B. Received program code may be executed by processor 807 as it is received, and/or stored in disk drive 810, or other non-volatile storage for later execution. In an embodiment, the computing system 800 operates in conjunction with a data storage system 831, e.g., a data storage system 831 that includes a database 832 that is readily accessible by the computing system 800. The computing system 800 communicates with the data storage system 831 through a data interface 833. A data interface 833, which is coupled with the bus 806, transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing physics aware model reduction for a design, comprising:
    executing, by one or more computers, a sequence of instructions to perform a process, the process comprising:
    identifying a design model as well as a first region and a second region in the design model;
    generating a first set of solutions comprising one or more distributions of circuit behaviors for the design model with a first discretization scheme and a plurality of inputs received at a user interface; and
    in response to at least the plurality of inputs received at the user interface,
        determining a second discretization scheme for the first region and a third discretization scheme for the second region, the second and third discretization schemes respectively corresponding to different model reduction techniques based at least in part on the one or more distributions; and
        generating and displaying, in the user interface, graphical representations of a first reduced sub-model and a second reduced sub-model at least by performing geometry simplification and re-discretization on the first region with the second discretization scheme and further on the second region with the third discretization scheme; and
    generating a second set of solutions with at least the second discretization scheme, the third discretization scheme, the first reduced sub-model, the second reduced sub-model, and the plurality of inputs.

2. The computer implemented method of claim 1, generating the first set of solutions comprising:
    identifying the plurality of inputs comprising one or more initial conditions, one or more boundary conditions, one or more property values, or one or more tolerances.

3. The computer implemented method of claim 2, generating the first set of solutions comprising:
    performing geometry simplification on the design model into a simplified design model without accounting for underlying physics or physical or electrical characteristics of the design model.

4. The computer implemented method of claim 1, generating the first set of solutions comprising:
    identifying first discretization scheme based in part or in whole upon a first tolerance; and
    discretizing the design model or a simplified design model into a first set of meshes with the first discretization scheme.

5. The computer implemented method of claim 1, determining the second discretization scheme comprising:
    identifying a physical or electrical characteristic of interest for the design model;
    identifying a spatial distribution of the physical or electrical characteristic in the design model from the first set of solutions; and
    determining a plurality of model reduction schemes for the design model based in part or in whole on the spatial distribution of the physical or electrical characteristic.

6. The computer implemented method of claim 5, wherein the design model comprises a three-dimensional or a pseudo-three-dimensional integrated circuit design, and the physical or electrical characteristic of interest comprises an electrical characteristic pertaining to an electromagnetic field generated by at least one circuit component in the three-dimensional or a pseudo-three-dimensional integrated circuit design.

7. The computer implemented method of claim 5, determining the second discretization scheme comprising:
    partitioning at least a portion of the design model into at least the first and second regions based in part or in whole upon the plurality of model reduction schemes and the spatial distribution of the physical or electrical characteristic of interest; and
    reducing the design model or a simplified design model into a plurality of reduced design models at least by applying the plurality of model reduction schemes to at least the first and second regions.

8. The computer implemented method of claim 7, determining the second discretization scheme comprising:
    identifying a second tolerance for the second discretization scheme; and
    determining the second discretization scheme with the plurality of model reduction schemes and the second tolerance.

9. The computer implemented method of claim 8, comprising:
    discretizing the plurality of reduced design models into a plurality of second sets of meshes with the second discretization scheme;
    generating analysis or simulation results for a second set of solutions at least by analyzing or simulating the plurality of reduced design models using one or more physics-based models with the plurality of second sets of meshes; and
    determining whether the analysis or simulation results converge based at least in part on one or more convergence criteria.

10. The computer implemented method of claim 9, generating the second set of solutions further comprising:
adapting the second discretization scheme for the plurality of reduced design models based in part or in whole upon one or more local precision requirements; and
generating the second set of solutions for the physical or electrical characteristic of interest when the analysis or simulation results are determined to have converged based in part or in whole upon the one or more convergence criteria.

11. The computer implemented method of claim 9, generating the second set of solutions further comprising:
readying the design for manufacturing at least by improving the design represented by the design model based in part or in whole upon the second set of solutions.

12. A system for implementing physics aware model reduction for a design, comprising:
a plurality of modules, at least one of which comprises at least one microprocessor including one or more processor cores executing one or more threads in a computing system;
a non-transitory computer accessible storage medium storing thereupon program code that includes a sequence of instructions that, when executed by the at least one microprocessor or processor core of a computing system, causes the at least one microprocessor or the one or more processor cores at least to:
identify a design model as well as a first region and a second region in the design model;
generate a first set of solutions comprising one or more distributions of circuit behaviors for the design model with a first discretization scheme and a plurality of inputs received at a user interface; and
in response to at least the plurality of inputs received at the user interface,
determine a second discretization scheme for the first region and a third discretization scheme for the second region, the second and third discretization schemes respectively corresponding to different model reduction techniques based at least in part on the one or more distributions; and
generate and display, in the user interface, graphical representations of a first reduced sub-model and a second reduced sub-model at least by performing geometry simplification and re-discretization on the first region with the second discretization scheme and further on the second region with the third discretization scheme based; and
generate a second set of solutions with at least the second discretization scheme, the third discretization scheme, the first reduced sub-model, the second reduced sub-model, and the plurality of inputs.

13. The system of claim 12, wherein the program code includes further instructions that, when executed by the at least one microprocessor or processor core, cause the at least one processor or processor core to:
identify the plurality of inputs comprising one or more initial conditions, one or more boundary conditions, one or more property values, or one or more tolerances;
identify first discretization scheme based in part or in whole upon a first tolerance; and
discretize the design model or a simplified design model into a first set of meshes with the first discretization scheme.

14. The system of claim 12, wherein the program code includes further instructions that, when executed by the at least one microprocessor or processor core, cause the at least one processor or processor core to:
identify a physical or electrical characteristic of interest for the design model;
identify a spatial distribution of the physical or electrical characteristic in the design model from the first set of solutions; and
determine a plurality of model reduction schemes for the design model based in part or in whole on the spatial distribution of the physical or electrical characteristic, wherein
the design model comprises a three-dimensional or a pseudo-three-dimensional integrated circuit design, and
the physical or electrical characteristic of interest comprises an electrical characteristic pertaining to an electromagnetic field generated by at least one circuit component in the three-dimensional or a pseudo-three-dimensional integrated circuit design.

15. The system of claim 14, wherein the program code includes further instructions that, when executed by the at least one microprocessor or processor core, cause the at least one processor or processor core to:
partition at least a portion of the design model into at least the first and second regions based in part or in whole upon the plurality of model reduction schemes and the spatial distribution of the physical or electrical characteristic of interest; and
reduce the design model or a simplified design model into a plurality of reduced design models at least by applying the plurality of model reduction schemes to at least the first and second regions.

16. The system of claim 15, wherein the program code includes further instructions that, when executed by the at least one microprocessor or processor core, cause the at least one processor or processor core to:
discretize the plurality of reduced design models into a second plurality of sets of meshes with the second discretization scheme;
generate analysis or simulation results at least by analyzing or simulating the reduced design model using one or more physics-based models with the second plurality of sets of meshes; and
determine whether the analysis or simulation results converge based at least in part on one or more convergence criteria.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing physics aware model reduction for a design, the set of acts comprising:
executing, by one or more computers, a sequence of instructions to perform a process, the process comprising:
identifying a design model as well as a first region and a second region in the design model;
generating a first set of solutions comprising one or more distributions of circuit behaviors for the design model with a first discretization scheme and a plurality of inputs received at a user interface; and
in response to at least the plurality of inputs received at the user interface,
determining a second discretization scheme for the first region and a third discretization scheme for the second region, the second and third discretization schemes respectively corresponding to different model reduction techniques based at least in part on the one or more distributions; and generating and displaying, in the user interface, graphical representations of a first reduced sub-model and a second reduced sub-model at least by performing geometry simplification and re-discretization on the first region with the second discretization scheme and further on the second region with the third discretization scheme; and generating a second set of solutions with at least the second discretization scheme, the third discretization scheme, the first reduced sub-model, the second reduced sub-model, and the plurality of inputs.

18. The article of manufacture of claim 17, the set of acts further comprising:
identifying a physical or electrical characteristic of interest for the design model;
identifying a spatial distribution of the physical or electrical characteristic in the design model from the first set of solutions; and
determining a plurality of model reduction schemes for the design model based in part or in whole on the spatial distribution of the physical or electrical characteristic, wherein
the design model comprises a three-dimensional or a pseudo-three-dimensional integrated circuit design, and
the physical or electrical characteristic of interest comprises an electrical characteristic pertaining to an electromagnetic field generated by at least one circuit component in the three-dimensional or a pseudo-three-dimensional integrated circuit design.

19. The article of manufacture of claim 17, the set of acts further comprising:
partitioning at least a portion of the design model into at least the first and second regions based in part or in whole upon the plurality of model reduction schemes and a spatial distribution of the physical or electrical characteristic of interest;
reducing the design model or a simplified design model into a plurality of reduced design models at least by applying the plurality of model reduction schemes to at least the first and second regions;
discretizing the plurality of reduced design models into a second plurality of sets of meshes with the second discretization scheme;
generating analysis or simulation results at least by analyzing or simulating the plurality of reduced design models using one or more physics-based models with the plurality of second sets of meshes; and
determining whether the analysis or simulation results converge based at least in part on one or more convergence criteria.

20. The article of manufacture of claim 19, the set of acts further comprising:
adapting the second discretization scheme for a reduced design model based in part or in whole upon one or more local precision requirements; and
generating the second set of solutions for the physical or electrical characteristic of interest when the analysis or simulation results are determined to have converged based in part or in whole upon the one or more convergence criteria; and
readying the design for manufacturing at least by improving the design represented by the design model based in part or in whole upon the second set of solutions.

* * * * *